US012355761B2

(12) United States Patent
Kwon et al.

(10) Patent No.: US 12,355,761 B2
(45) Date of Patent: Jul. 8, 2025

(54) ELECTRONIC DEVICE FOR VERIFYING A USER'S IDENTITY

(71) Applicant: SAMSUNG ELECTRONICS CO., LTD., Suwon-si (KR)

(72) Inventors: Eunyoung Kwon, Suwon-si (KR); Karam Park, Suwon-si (KR); Junsuk Oh, Suwon-si (KR); Inmyung Choi, Suwon-si (KR); Jisoo Lee, Suwon-si (KR); Taeckki Lee, Suwon-si (KR); Daehaeng Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 546 days.

(21) Appl. No.: 17/570,395

(22) Filed: Jan. 7, 2022

(65) Prior Publication Data

US 2022/0166769 A1    May 26, 2022

Related U.S. Application Data

(63) Continuation of application No. PCT/KR2021/017210, filed on Nov. 23, 2021.

(30) Foreign Application Priority Data

Nov. 25, 2020 (KR) .......................... 10-2020-0159424

(51) Int. Cl.
*H04W 12/72* (2021.01)
*H04L 9/40* (2022.01)
(Continued)

(52) U.S. Cl.
CPC ...... *H04L 63/0861* (2013.01); *H04L 63/0838* (2013.01); *H04L 63/0853* (2013.01);
(Continued)

(58) Field of Classification Search
CPC ............. H04L 63/0861; H04L 63/0853; H04L 63/0838; H04L 63/083; H04L 63/0815;
(Continued)

(56) References Cited

U.S. PATENT DOCUMENTS 10,333,707 B1\*   6/2019  Pathak .................. H04L 63/061
10,579,997 B2    3/2020  Sibert et al.
(Continued)

FOREIGN PATENT DOCUMENTS

KR    10-2011-0081103    7/2011
KR    10-2018-0129476    12/2018
(Continued)

OTHER PUBLICATIONS

Lee, A wireless telecommunication device with output control function and transaction authentication system using the same, May 2009, pp. 1-7 (Year: 2009).\*

(Continued)

*Primary Examiner* — Keith Ferguson
(74) *Attorney, Agent, or Firm* — Nixon & Vanderhye, P.C.

(57) ABSTRACT

Provided is a portable electronic device including, a biometric sensor; a touch sensing display; a wireless communication module including wireless communication circuitry; a processor operatively connected to the biometric sensor, the display, and the wireless communication module; and a memory operatively connected to the processor, wherein the memory stores instructions which, when executed, cause the processor to: control the wireless communication module to perform data communication for user authentication with an authentication server based on reception of biometric information of a user from the biometric sensor, based on verifying that the user is qualified to use the portable electronic device via the data communication with (Continued)

the authentication server, perform data communication for identity verification of the user with a verification server via the wireless communication module, receive, from the verification server via the wireless communication module, a uniform resource locator (URL) including a one-time token for accessing a verification result provided by the verification server, transmit the one-time token to a service server that provides an on-line service via the wireless communication module, and control the display to display a code including the one-time token on the display.

18 Claims, 7 Drawing Sheets

(51) Int. Cl.
*H04W 12/03* (2021.01)
*H04W 12/069* (2021.01)

(52) U.S. Cl.
CPC ......... *H04W 12/03* (2021.01); *H04W 12/069* (2021.01); *H04W 12/72* (2021.01)

(58) Field of Classification Search
CPC ... H04L 9/3226; H04L 9/3213; H04L 9/3228; H04L 2209/80; H04L 9/0863; H04L 9/0825; H04W 12/06; H04W 12/72; H04W 12/03

See application file for complete search history.

(56) References Cited

U.S. PATENT DOCUMENTS

| | | | |
|---|---|---|---|
| 11,893,570 B1* | 2/2024 | Tougas | G06Q 20/209 |
| 2011/0082791 A1 | 4/2011 | Baghdasaryan et al. | |
| 2012/0090038 A1 | 4/2012 | Pacella et al. | |
| 2015/0081538 A1 | 3/2015 | Renard et al. | |
| 2017/0308695 A1* | 10/2017 | Adams | H04L 63/06 |
| 2018/0012324 A1 | 1/2018 | Kelts | |
| 2018/0083959 A1* | 3/2018 | Barbosa | H04W 12/068 |
| 2018/0341763 A1 | 11/2018 | Park et al. | |
| 2021/0049614 A1* | 2/2021 | Jurss | G06Q 20/3224 |
| 2021/0314309 A1 | 10/2021 | Lee et al. | |

FOREIGN PATENT DOCUMENTS

| | | | | |
|---|---|---|---|---|
| KR | 10-2019-0038550 | | 4/2019 | |
| KR | 10-2019-0138389 | | 12/2019 | |
| KR | 10-2020-0034289 | | 3/2020 | |
| KR | 10-2020-0075522 | | 6/2020 | |
| WO | WO-2013034865 A1 * | | 3/2013 | ......... H04L 63/0853 |

OTHER PUBLICATIONS

Cho, KR 20110057279 A, The account method of credit card which is combined the goods buying code with mobile network, Jun. 2011, pp. 1-4 (Year: 2011).*

Shigeo, Method, Program, Information processing apparatus, and server apparatus for mandaging electronic receipt, Feb. 2019, p. 1 (Year: 2019).*

(WO 2011083867 A1), Hishinuma Noboru, Authentication Device, Authentication Method, and Program, Jul. 2011 , pp. 1-12 (Year: 2011).*

Search Report and Written Opinion issued Feb. 25, 2022 in counterpart International Patent Application No. PCT/KR2021/017210.

Office Action dated Jan. 18, 2025 in Korean Patent Application No. 10-2020-0159424 and English-language translation.

* cited by examiner

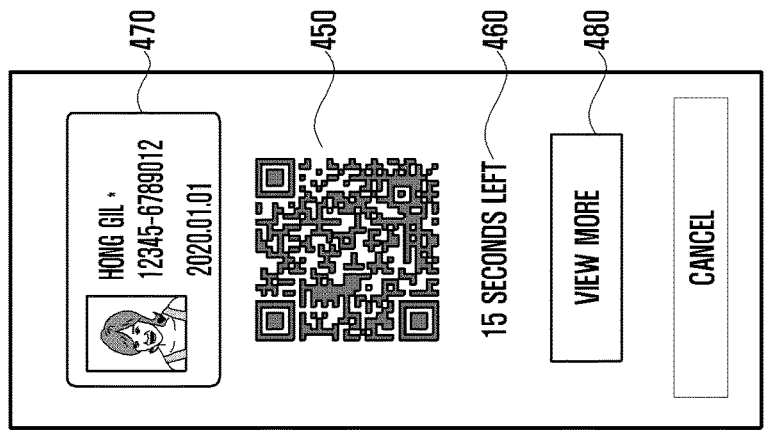
FIG. 4C
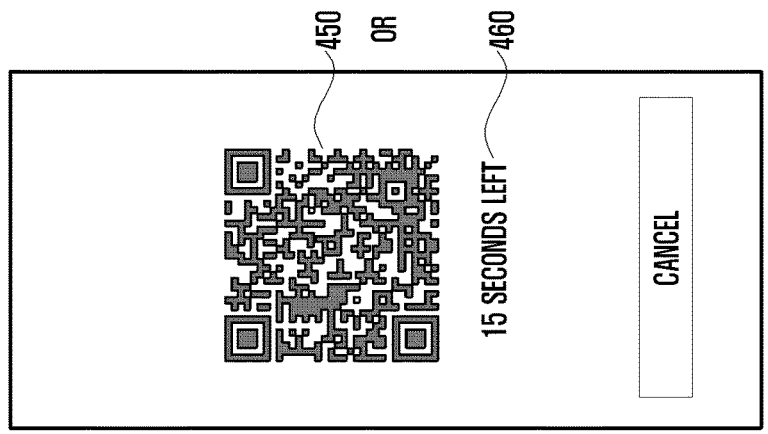
FIG. 4D
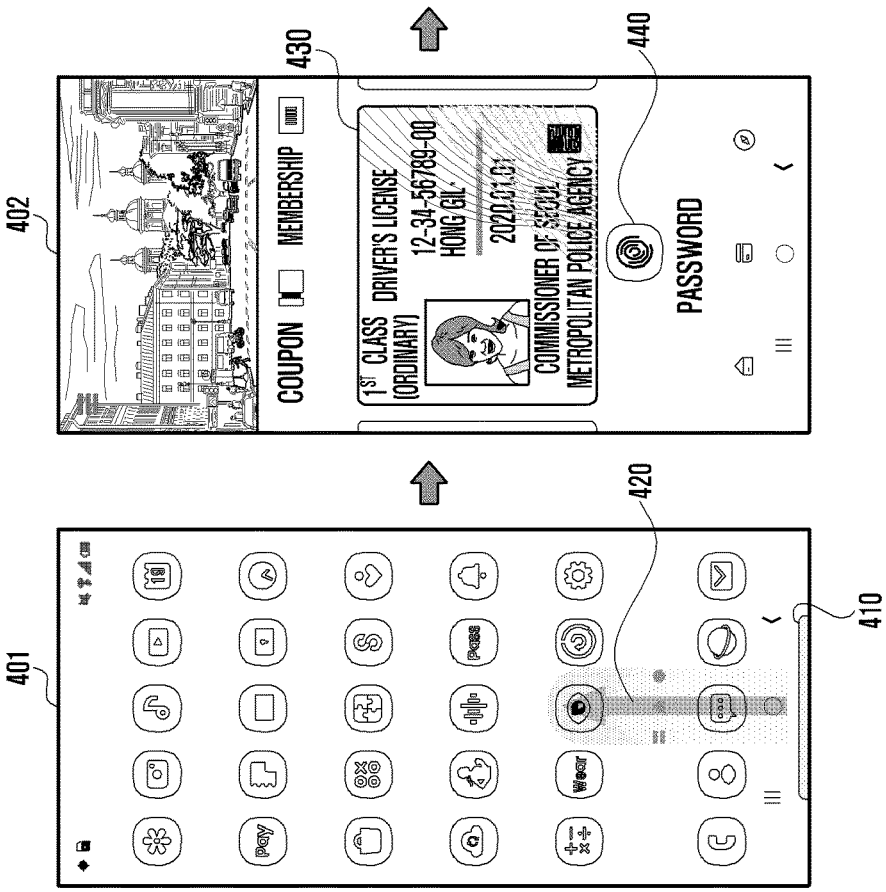
FIG. 4A
FIG. 4B

ELECTRONIC DEVICE FOR VERIFYING A USER'S IDENTITY

CROSS-REFERENCE TO RELATED APPLICATIONS

This application is a continuation of International Application No. PCT/KR2021/017210 designating the United States, filed on Nov. 23, 2021, in the Korean Intellectual Property Receiving Office and claiming priority to Korean Patent Application No. 10-2020-0159424, filed on Nov. 25, 2020, in the Korean Intellectual Property Office, the disclosures of which are incorporated by reference herein in their entireties.

BACKGROUND

Field

The disclosure relates to verifying the identity of a user using a portable electronic device, instead of using a plastic ID card.

Description of Related Art

A portable electronic device (e.g., a smartphone) may support a mobile identification service which is capable of verifying the identity of a user, instead of an identification provided in a plastic or paper format (e.g., an identification card, a passport, or a driver's license). For example, ISO 18013-5 is the standard specification defined by the international organization for standardization (ISO) for a mobile driving license (mDL). The ISO 18013-15 standard may include an mDL issuing authority (IA), a user equipment (mDL holder), and a mDL reader. The mDL reader may verify whether an mDL that a UE has is normally issued from an mDL issuing authority according to an authentication protocol.

In an offline mode (or in a device retrieval mode), a UE and a reader may use a transmission medium, for example, BLE, Wi-Fi aware, and/or NFC for transmitting and receiving data when verifying the identity of a user who uses the UE. An offline store may be furnished with a point of sale (PoS) terminal that reads a barcode or a QR code, as a reader. However, it is rare that the PoS terminal is equipped with a transmission medium such as BLE, Wi-Fi aware, or the like.

In an online mode (or in a server retrieval mode), a reader may receive a token and a URL of an issuing authority from a UE via a QR code or an NFC, and may transmit an mDL request message including the token to the URL of the issuing authority. The issuing authority may verify the token in response to the request message, may issue corresponding identity information (mDL), and may transmit the same to the reader. However, the online mode may be difficult to be applied to the case (use case) in which a UE solely requests identity verification without a reader.

SUMMARY

Embodiments of the disclosure provide an electronic device configured to be capable of supporting verification of the identity of a user using a normal POS terminal in an offline store, and configured to be capable of supporting verification of the identity of a user without a separate reader in an online store.

The disclosure is not limited to the above-mentioned technical subject matter.

In accordance with an example embodiment of the disclosure, a portable electronic device may include: a biometric sensor; a touch sensing display; a wireless communication module including wireless communication circuitry; a processor operatively connected to the biometric sensor, the display, and the wireless communication module; and a memory operatively connected to the processor, wherein the memory stores instructions which, when executed, cause the processor to: control the wireless communication module to perform data communication for user authentication with an authentication server based on receiving of biometric information from the biometric sensor; based on verifying that a user is qualified to use the portable electronic device via the data communication with the authentication server, perform data communication for identity verification with a verification server via the wireless communication module; receive, from the verification server via the wireless communication module, a uniform resource locator (URL) including a one-time token for accessing a verification result provided by the verification server; transmit the one-time token to a service server that provides an on-line service via the wireless communication module; and display a code including the one-time token on the display.

In accordance with an example embodiment of the disclosure, an electronic device may include: a communication module including communication circuitry; a processor operatively connected to the communication module; and a memory operatively connected to the processor, wherein the memory stores instructions which, when executed, cause the processor to control the communication module to: perform data communication for identity verification of a user with a user equipment (UE); transmit a uniform resource locator (URL) including a one-time token for accessing an identity verification result to the UE; and in response to receiving of a token from an external electronic device via the communication module, transmit the identity verification result to the external electronic device.

According to various example embodiments, a portable electronic device can verify the identity of a user by interoperating with an external electronic device (e.g., a POS terminal, a verification server, an authentication server, and a service server) via a network, instead of using an identification in a plastic format.

In addition, various effects directly or indirectly recognized from the disclosure can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A, 4B, 4C and 4D are diagrams illustrating example UI elements displayed in a user equipment (UE) while an operation for verifying identity is performed according to various embodiments;

DETAILED DESCRIPTION

Figure 1:
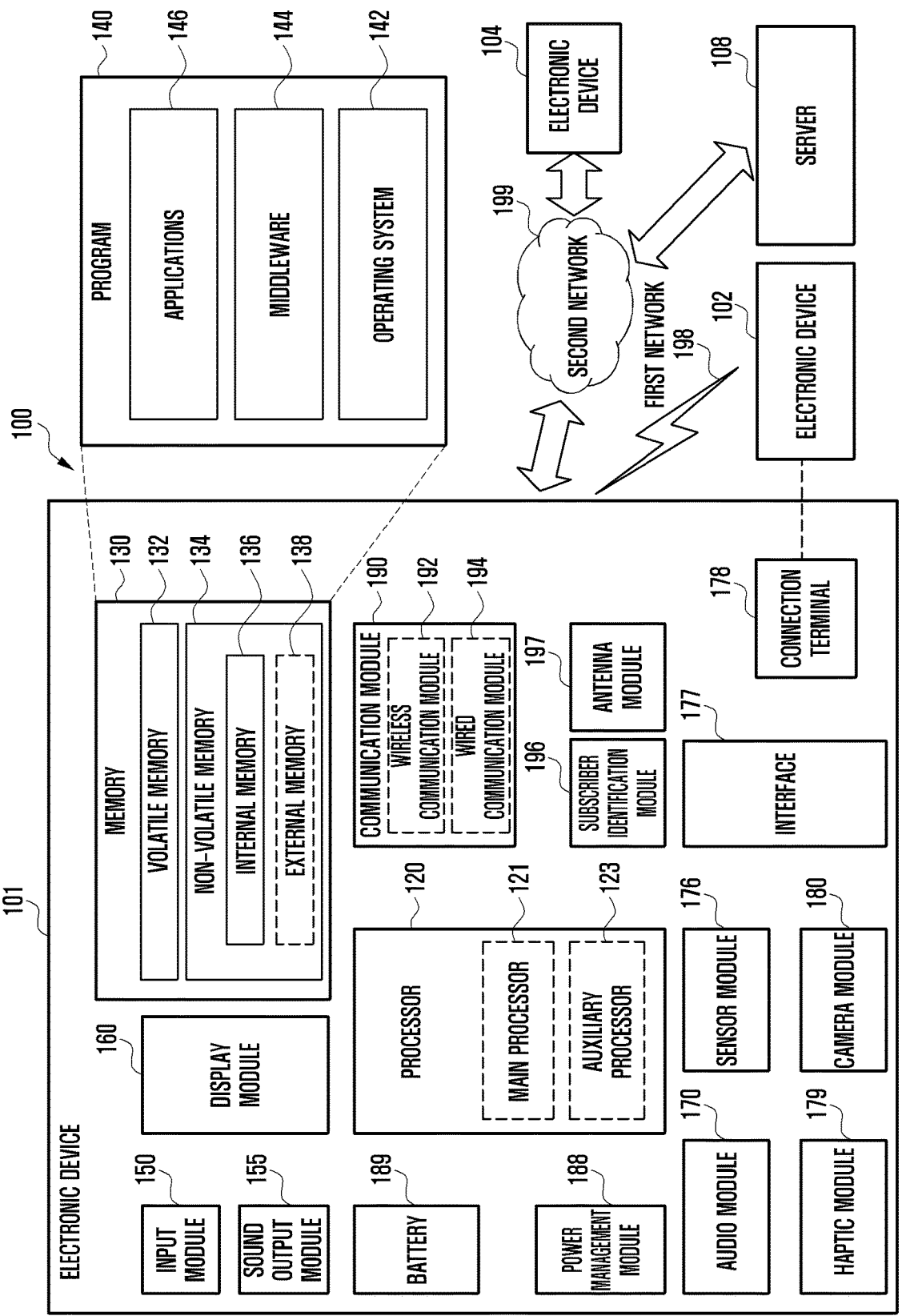
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
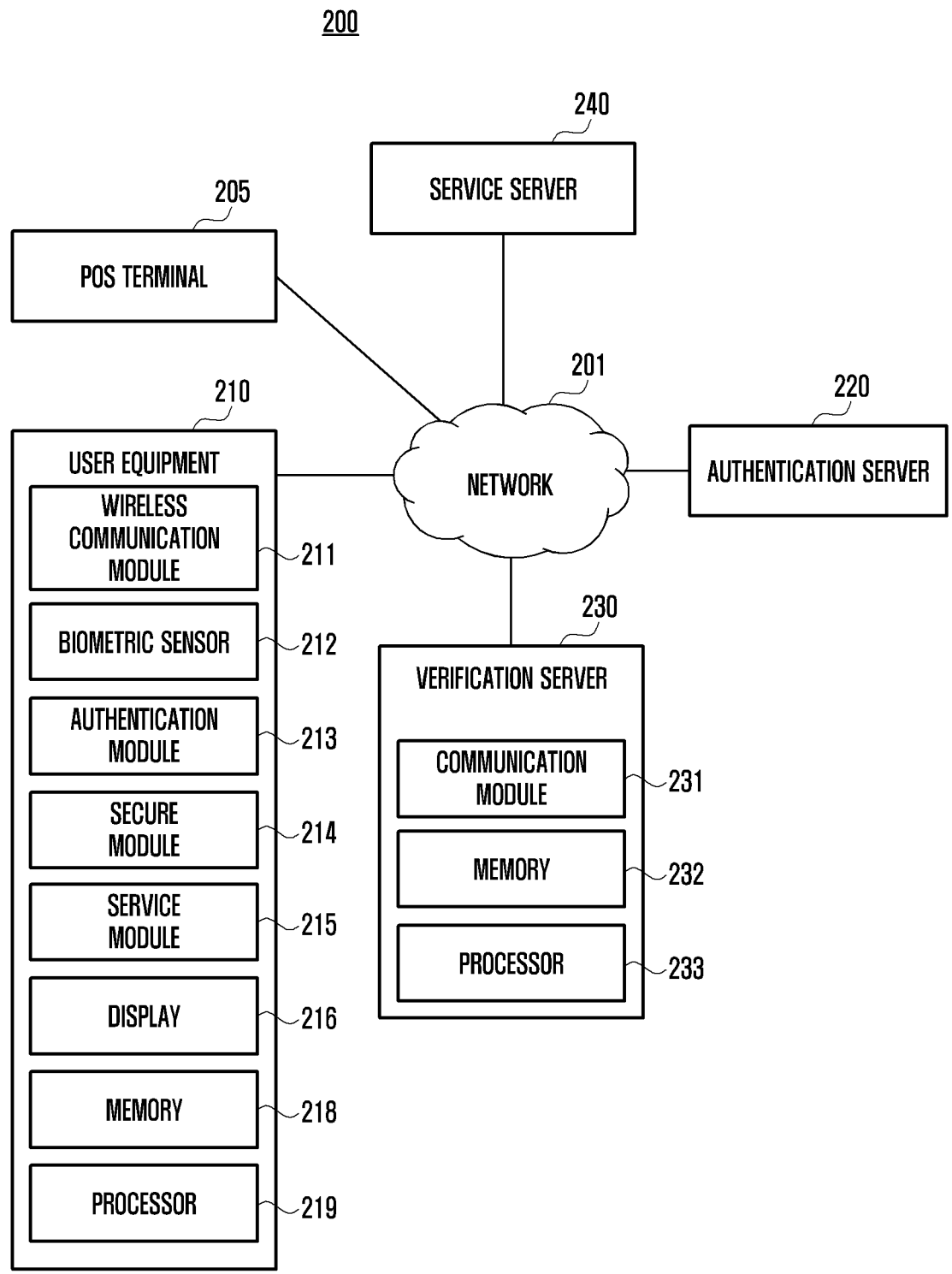
FIG. 2 is a block diagram illustrating an example system configured to verify the identity of a user using a portable electronic device, instead of using a plastic ID card, according to various embodiments.

FIG. 2 is a block diagram illustrating an example system configured to verify the identity of a user using a portable electronic device, instead of using a plastic ID card, according to various embodiments. Referring to FIG. 2, a system 200 may include a point-of-sale (POS) terminal 205, a user equipment (UE) 210, an authentication server 220, a verification server 230, and a service server 240. According to an embodiment, at least one (e.g., the POS terminal 205) of the elements of the system 200 may not engage in an operation of verifying identity.

The UE 210 (e.g., the electronic device 101 of FIG. 1) may perform data communication for user authentication with the authentication server 220 via a network 201 (e.g., the first network 198 of FIG. 1 and/or the second network 199). The UE 210 may perform data communication for identity verification of a user, with the verification server 230 via the network 201. For example, the UE 210 may perform a user authentication operation (e.g., an operation of identifying whether a user is qualified to use the UE 210) via the data communication with the authentication server 220. If the user authentication operation identifies that the user is qualified to use the UE 210, the UE 210 may perform an operation of verifying the identity of the user, with the verification server 230 via relay by the authentication server 220 (or directly). When the identity of the user is verified by the verification server 230, the UE 210 may receive, from the verification server 230, an Internet address (uniform resource location (URL)) for accessing the verification server 230, and a one-time token for accessing data corresponding to an identity verification result. The internet address of the verification server 230 may be configured with, for example, a communication protocol (e.g., https), the domain name of the verification server 230, and a token.

According to an embodiment for verifying the identity of a purchaser (user) for a seller (clerk) in an offline store, the UE 210 may display a code (e.g., a barcode or a quick response (QR) code) including the URL and token received from the verification server 230 on the display 216. The UE 210 may identify a domain name from the URL, and may recognize that the identified domain name is identical to a domain name that is already known (e.g., kica. co. kr). If the domain name of the verification server 230 is fixed as described above, the UE 210 may display a code including only the one-time token on the display 216. The POS terminal 205 may be an electronic device prepared in a store, and may include a reader for reading a code (e.g., a barcode or a QR code) and a communication module for performing data communication with the service server 240 via the network 201. The POS terminal 205 may obtain a URL and a token (or only a token) from a barcode or a QR code displayed on the display 216 of the UE 210, and may transmit the obtained URL and token (or only the token) to the service server 240. The service server 240 may access the verification server 230 which covers identity verification, using the URL and token received from the POS terminal 205, and may identify a user identity verification result. If only a token is received from the POS terminal 205, the service server 240 may configure a URL using the received token and the domain name of the verification server 230 that is already known. The service server 240 may access the verification server 230 using the configured URL, so as to identify the user identity verification result. The verification result may include information indicating that the identity of a user is verified (e.g., a user is verified as having a driver's license), and/or information indicating that a user is verified as an adult. Accordingly, for a clerk in the store, the user may verify the identity of the user (or that the user is an adult) using the UE 210 without using an identification in a plastic format, and may purchase a product (e.g., cigarette and liquor) in the store.

According to an embodiment that verifies the identity of a user for a service server 240 that provides an online service (e.g., a non-contact credit card issuing service, or a digital car key for starting a rental car or sharing car), the UE 210 may transmit the URL and token received from the verification server 230 to the service server 240. If a domain name identified from the URL is the domain name of the verification server 230 that is already known, the UE 210 may transmit only the token to the service server 240. The service server 240 may access the verification server 230 using the URL and token received from the UE 210 (or using the URL configured using the received token), and may identify a user identity verification result from the verification server 230. For example, the verification result may include information indicating that the identity of the user is verified and/or information indicating that the user is verified as an adult. Accordingly, the service server 240 may provide a service to the user via the UE 210. For example, the service server 240 may transmit a digital car key to the UE 210.

The UE 210 may include a wireless communication module (e.g., including wireless communication circuitry) 211, a biometric sensor 212, an authentication module (e.g., including various processing circuitry and/or executable program instructions) 213, a secure module (e.g., a secure storage) 214, a service module (e.g., including various processing circuitry and/or executable program instructions) 215, a touch sensing display 216, a memory 218, and a processor (e.g., including processing circuitry) 219. The above-mentioned elements of the UE 210 may be operatively or electrically connected to each other.

The wireless communication module 211 (e.g., the communication module 190 of FIG. 1) may include various wireless communication circuitry and support data communication via the network 201 between the UE 210 and an external electronic device (e.g., the authentication server 220, the verification server 230, and the service server 240).

According to an embodiment, the wireless communication module 211 may include a first communication module including various communication circuitry configured to support wireless communication of the UE 210 via a second network (e.g., a cellular network) (e.g., the second network 199 of FIG. 1), and a second communication module configured to support wireless communication of the UE 210 based on an out of band (OOB) (e.g., NFC, BLE, UWB, Zigbee and/or wireless fidelity (Wi-Fi) 2.4 GHz). According to an embodiment, the UE 210 may perform communication with an external server (e.g., external servers 220 to 240)

using the first communication module. According to an embodiment, the UE 210 may perform communication with the POS terminal 205 via the first network (e.g., a short-range communication network such as Bluetooth, NFC, Wi-Fi direct, or infrared data association (IrDA)) (e.g., the first network 198 of FIG. 1) which is different from the second network.

The biometric sensor 212 may produce data to be used for recognizing biometric information of a user. For example, the biometric sensor 212 may include a fingerprint sensor for sensing a user fingerprint and/or an image sensor (e.g., an infrared light sensor) for sensing a feature point of a user iris or face.

The authentication module 213, the secure module 214, and the service module 215 may be stored as instructions in the memory 218 (e.g., the memory 130 of FIG. 1) and may be executed by the processor 219 (e.g., the processor 120 of FIG. 1).

The authentication module 213 (e.g., Samsung Pass) may display a user interface (UI) element that induces inputting of an image indicating the identity of the user and user information (e.g., passwords or biometric information) on the display 216. According to an embodiment, the identification of the user may include a certificate (or real name verification) that is managed by a national institute (or an issuing authority) and authenticates a user (e.g., verifies an identity), such as an identification card, a driver's license, and/or a passport. In response to reception of user information from the biometric sensor 212 or the display 216 while the UI element is displayed, the authentication module 213 may perform data communication for user authentication with the authentication server 220 via the wireless communication module 211. When user authentication is completed by the authentication server 220, the authentication module 213 may perform data communication with the verification server 230 (e.g., end-to-end encryption communication via the authentication server 220), so as to support verification of the identity of the user performed by the verification server 230. When the identity of the user is verified by the verification server 230, the authentication module 213 may receive a token and a URL from the verification server 230. The authentication module 213 may display, on the display 216, a code including the token and the URL received from the verification server 230. If a domain name obtained from the received URL is the domain name of the verification server 230 that is already known, the authentication module 213 may display a code including only the token on the display 216.

The secure module 214 may store identity information (e.g., a mobile driver's license (mDL)) issued from a server of an issuing authority (IA) (e.g., Korea information certificate authority (KICA)). According to an embodiment, the server of the issuing authority may store and manage the identity information of a real identification (e.g., an identification in a plastic format). For example, identity information corresponding to the driver's license that a user (e.g., a licensee) obtains may be stored. For example, if the user of the UE 210 acquires a driver's license, the identity information associated with the driver's license that the user obtains and personal information of the user may be registered with the server of the issuing authority. Here, the server of the issuing authority may verify the issued identity information. For example, the server of the issuing authority may be a server integrated with the verification server 230. If the identification from the UE 210 is authenticated and it is identified that the possessor of the UE 210 is identical to the possessor of the identification, the issuing server may transmit the identity information to the UE 210. The UE 210 may store the identity information received from the issuing authority in the secure module 214. Authentication may be performed in a manner in that UE 210 scans an identification, for example, a plastic identification, using an optical character recognition (OCR) or tags an electronic identification using near field communication (NFC) technology, or a user inputs information recorded in the identification directly to the UE 210. Whether the possessor of the UE 210 is identical to the possessor of the identification may be identified based on a universal subscriber identity module (USIM) based identification authentication service of a communication operator.

The secure module 214 may support end-to-end encryption communication (e.g., between UE 210 and the verification server 230). For example, the secure module 215 may produce and store a one-time session key for encrypting data (e.g., identity information required by the verification server 230) for encrypted data communication with the verification server 230, or for decrypting encrypted data (e.g., encrypted data received from the verification server 230). Here, "one-time" may refer, for example, to the corresponding session key being effective only one time for encrypting or decrypting data. According to an embodiment, the secure module 214 may produce a session key using a key derivation function which uses a public key and a private key as an input value. The public key and/or private key produced by the secure module 214 may be a one-time key. The secure module 214 may be stored in a secure area (e.g., an embedded secure element (eSE)) in the memory 218, and may be executed by a sub-processor (e.g., the sub-processor 123 of FIG. 1) specialized in data security. For example, the UE 210 may be a holder which obtains a mobile identification issued from the server of the issuing authority in a mobile identification system, stores the same in a secure area (e.g., eSE), and provides (e.g., displays or transmits) at least part of the information associated with the mobile identification depending on the use environment of the mobile identification (e.g., an offline mode or an online mode). For example, the secure area may be a space (or area) included in a part of the memory 218, or may be a chip physically separated from the memory 218. The authentication module 213 may include a software development kit (SDK) for communication with the secure module 214 stored in the secure area.

The service module 215 may be implemented as a web browser or an application that the service server 240 distributes online (e.g., an application store). Before providing an online service to a user, the service module 215 may request user authentication and identity verification from the authentication module 213. The service module 215 may receive a token and a URL from the authentication module 213 in response to the request. The service module 215 may transmit the token and URL received from the authentication module 213 to the service server 240 via the wireless communication module 211. If a domain name identified from the received URL is the domain name of the verification server 230 that is already known, the service module 215 may transmit only the token to the service server 240. The service module 215 may receive a verification result from the verification server 230 via the service server 240, and may support provision of an online service by the service server 240 according to the result.

According to an embodiment, the display 216 (e.g., the display module 160 of FIG. 1) may visually provide information (e.g., a mobile identification) to the outside (e.g., a user) of the UE 210. According to an embodiment, the display 216 may include a touch sensing circuit (or a touch sensor) (not illustrated), a pressure sensor for measuring a touch intensity, and/or a touch panel (e.g., digitizer) for detecting a magnetic field-based stylus pen, may measure a change in a signal (e.g., a voltage, the quantity of light, resistance, electromagnetic signal, and/or the quantity of electric charge) associated with a predetermined location of the display 216 based on the touch sensing circuit, the pressure sensor, or the touch panel, and may detect a touch input and/or a hovering input (or a proximity input). According to an embodiment, the display 216 may include a liquid crystal display (LCD), an organic light emitted diode (OLED), an active matrix organic light emitted diode (AMOLED), a flexible display, or the like.

According to an embodiment, the UE 210 may include various types of devices including a function of performing wireless communication with a server (e.g., the authentication server 220, the verification server 230, and/or the service server 240) via the second network (e.g., a cellular network), a function of performing wireless communication with the POS terminal 205 via the first network (e.g., out of band (OOB) network), and a function of providing data related to the mobile identification to the servers 220 to 240 and/or the POS terminal 205. For example, the UE 210 may include a mobile device such as a smart phone, a tablet, a personal computer (PC), and/or a wearable device, or the like.

The authentication server 220 may operate as a gateway that relays data communication between the UE 210 and the verification server 230. For example, the verification server 230 that verifies issued identification information may differ for each country. The UE 210 may perform data communication for user identity verification with the verification server 230 via the authentication server 220 that perform user authentication, rather than individually performing direct communication with a plurality of verification servers 230. For example, the authentication server 220 may preferentially perform user authentication by interoperating with the UE 210. If user authentication is successfully performed, the authentication server 220 may act as a gateway in order to perform an identity verification operation according to an authentication protocol (e.g., mDL authentication protocol) designated between the UE 210 and the verification server 230 (e.g., mDL reader). In this instance, end-to-end security communication may be required between the UE 210, as a mDL holder, and the verification server 230, as an mDL reader. For example, data transmitted and received via a communication channel (or a communication session) established between the UE 210 and the gateway (authentication server 220), and data transmitted and received via a communication channel established between the gateway and the verification server 230 may be protected by a hypertext transfer protocol over secure socket layer (HTTPS). According to an embodiment, the authentication server 220 may verify issued identity information. For example, the authentication server 220 may be a server integrated with the verification server 230.

The verification server 230 may include an element and/or circuitry which is substantially the same as at least one of the elements of the electronic device 101. For example, the verification server 230 may include a communication module (e.g., including communication circuitry) 231, a memory 232, and a processor (e.g., including processing circuitry) 233. The above-mentioned elements of the verification server 230 may be operatively or electrically connected to each other. The communication module 231 of the verification server 230 may support data communication via the network 201 between the verification server 230 and an external electronic device (e.g., the UE 210, the authentication server 220, and/or the service server 240). The memory 232 of the verification server 230 may store instructions which, when executed, enable the processor 233 to perform an operation of verifying the identity of a user by performing data communication (e.g., end-to-end encryption communication) with the UE 210 via the authentication server 220 (or via the network 201 without relay by the authentication server 220), an operation of transmitting a URL including a token for accessing an identity verification result to the UE 210 via the authentications server 220 (or via the network 201 without relay by the authentication server 220), and an operation of providing the identity verification result to the service server 240 that accesses using the token.

The service server 240 may be a 3rd-party online server that provides a service to a user. The service server 240 may perform data communication with the verification server 230 according to the authentication protocol (e.g., open authentication (OAuth) 2.0). If the identity of a user needs to be authenticated or a user needs to be authenticated as an adult in advance in order to provide a service to the user, the service server 240 may request required user information from the verification server 230, and may receive a verification result from the verification server 230. For example, the service server 240 may access a file (an identity verification result) stored in the verification server 230 using a URL including a token received from the POS terminal 205 or the UE 210. When access to the file is allowed by the token, the service server 240 may identify the identity verification result. When the identity of the user is identified as being verified, the service server 240 may allow provision of a service (e.g., an online service or purchasing of a product in an offline store) to the user. According to an embodiment, the service server 240 may verify issued identity information. For example, the service server 240 may be a server integrated with the verification server 230.

Figure 3:
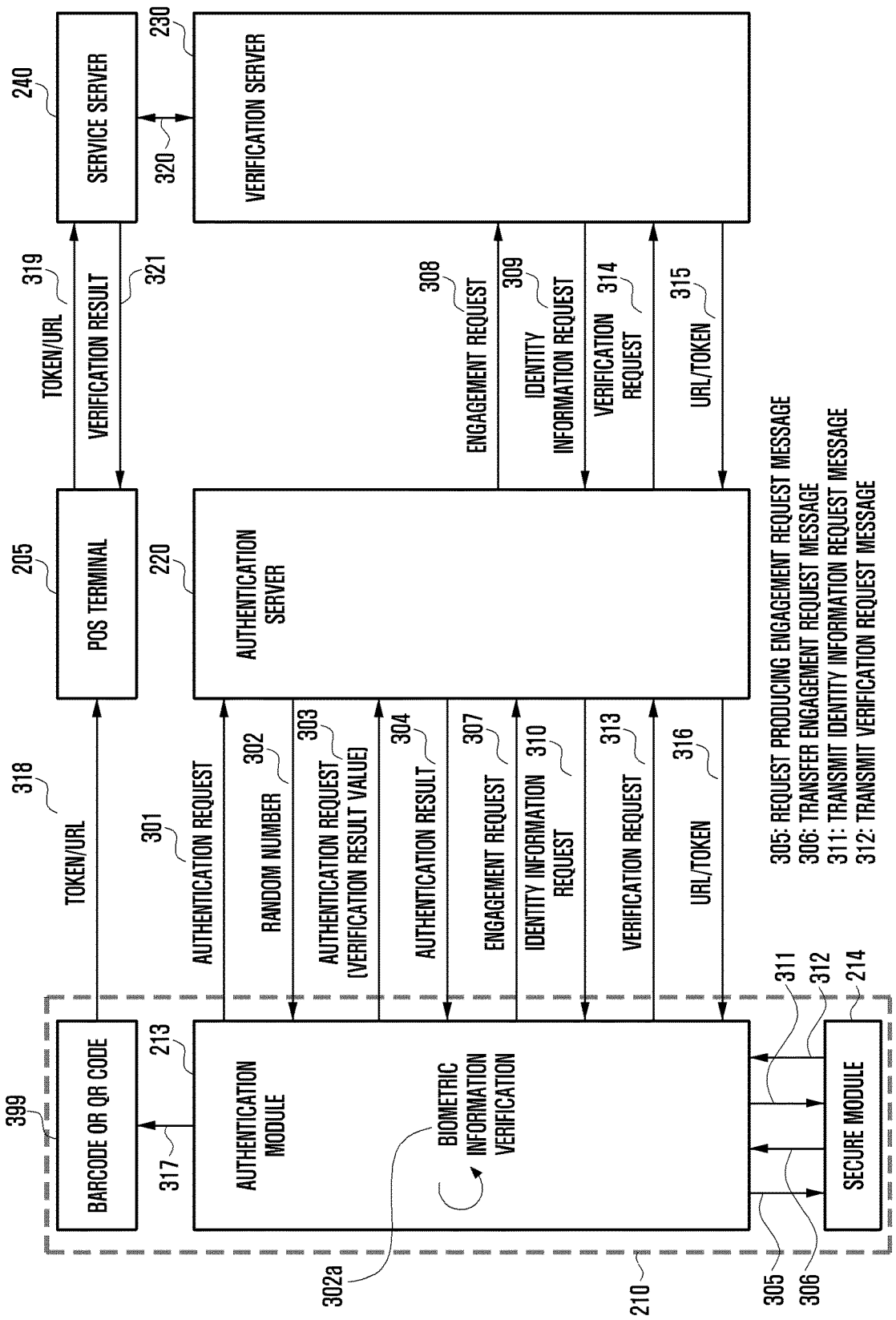
FIG. 3 is a signal flow diagram illustrating an example of verifying the identity of a user using a POS terminal, for a clerk in an offline store according to various embodiments.

FIG. 3 is a signal flow diagram illustrating an example of verifying the identity of a user using the POS terminal 205, for a clerk in an offline store according to various embodiments. FIGS. 4A, 4B, 4C and 4D are diagrams illustrating example UI elements displayed in the UE 210 while an operation of verifying identity is performed according to various embodiments. In the disclosure, a UI element may include a graphic element that enables an electronic device (e.g., the electronic device 101 of FIG. 1 or the UE 210 of FIG. 2) to interact with a user, and may include, for example, a video, an image, a text, a thumbnail, an emoticon, an icon, a keypad, a button, or a menu. A processor (e.g., the processor 120 of FIG. 1 or the processor 219 of FIG. 2) may perform a function that is operatively connected to a UI element, in response to a user input (e.g., a touch input) to the UI element.

According to an embodiment, FIGS. 3 and 4 may correspond to an example in which the UE 210 operates in an offline mode, so as to verify the identity of a user. The offline mode of the UE 210 may be an example in which the UE 210 provides a mobile identification service in the state of having a mobile identification (or mobile identification data or identity information) issued directly from the server of an issuing authority. In an offline store, a clerk may request identify verification from a user who desires to purchase a product (e.g., cigarette or liquor). Accordingly, the user may call an execution screen of the authentication module 213 to come to the display 216. For example, the UE 210 may display a first UI element 410 of FIG. 4A connected to the authentication module 213 in the bottom of a designated screen 401 (e.g., a home screen or a lock screen). Based on a user input to the first UI element 410 (e.g., a swipe gesture 420 toward the top of the screen), the UE 210 may display an execution screen 402 that supports purchasing of a product at an offline store. For example, the UE 210 may display, on the display, the execution screen 402 including an identification image 430 and a second UI element 440 for inducing input of a fingerprint. If the execution screen 402 includes another image (e.g., a credit card image) different from the identification image 430, a user input (e.g., a scroll gesture toward the left or the right of the screen) for bring the identification image 430 to the execution screen 402 of FIG. 4B may be additionally needed. If the scheme of authenticating the identity of the user is based on a fingerprint, the second UI element 440 may include a fingerprint-shaped image as illustrated in the drawing. If the scheme of authenticating the identity of the user is based on an iris or a face, instead of a fingerprint, the second UI element 440 may include a preview image (or a pupil-shaped image or a face-shaped image) captured by a camera (e.g., the camera module 180 of FIG. 1) disposed in the same side of the display 216.

The authentication module 213 may perform user authentication by interoperating with the authentication server 220 via the wireless communication module 211, in response to reception of user information from the biometric sensor 212 or the display 216. According to an embodiment, the authentication module 213 may perform fast identity online (FIDO) authentication using biometric information by interoperating with the authentication server 220. For example, the authentication module 213 (FIDO client) may perform operation 301 of transmitting an authentication request message to the authentication server 220 (FIDO server) via the wireless communication module 211. In response to the authentication request message, the authentication server 220 may perform operation 302 of producing and transmitting a random number (e.g., a challenge value) to the authentication module 213. The authentication module 213 may perform operation 302a of comparing biometric information received from the biometric sensor 212 and biometric information registered in the authentication module 213, so as to perform verification (or primary authentication) on the received biometric information. If it is verified that the two pieces of biometric information are identical, the authentication module 213 may produce a verification result value (or a primary authentication result value) using the random number received from the authentication server 220. For example, the authentication module 213 may perform operation 303 of producing a verification result value by signing the random number using a private key (or secret key), and transmitting the verification result value to the authentication server 220, so as to request the authentication server 220 to perform authentication (or secondary authentication) on the verification result value. Here, the private key may be produced as a key produced by the authentication module 213 during an operation of registering the biometric information of the user with the authentication module 213, and the private key may be produced as a pair with a public key. The private key is stored in the UE 210, and the public key is not encrypted by the authentication module 213 and is transmitted to the authentication server 220 as plain text. The authentication server 220 may perform operation 304 of identifying whether the verification result value received from the UE 210 is a signature for the random number that the authentication server 220 transmits, so as to perform authentication (or secondary authentication), and transmitting an authentication result value (or a secondary authentication result value) to the authentication module 213.

Since the authentication result from the authentication server 220 verifies that the user is qualified to use the UE 210, the authentication module 213 may perform operation 305 of requesting the secure module 214 to produce a message (e.g., mDL device engagement data) for requesting the verification server 230 to engage in encryption communication. In response to the request, the secure module 214 may produce a pair of a public key (e.g., an ephemeral public key) and a private key. The public key and/or the private key produced by the secure module 214 may be a one-time key. The secure module 214 may perform operation 306 of containing the private key in a secure area, and including the public key in an engagement request message (e.g., mDL device engagement data) to be transmitted to the verification server 230 together with a parameter that needs to be configured for encryption communication, and transmitting the same to the authentication module 213. The authentication module 213 may perform operation 307 of transmitting the engagement request message (e.g., mDL device engagement data) to the authentication server 220. The authentication server 220 may perform operation 308 of transmitting the engagement request message (e.g., mDL device engagement data) to the verification server 230.

In response to reception of the engagement request message (e.g., mDL device engagement data), the verification server 230 may perform an operation of producing a pair of a one-time private key and a one-time public key, an operation of obtaining, from the engagement request message, a public key that the authentication module 213 of the UE 210 sends, an operation of producing a first session key using a key derivation function that uses, as an input value, a first value, the public key of the UE 210 obtained from the engagement request message, and the produced private key of the verification server 230, and an operation of producing a message (e.g., mDL session establishment data) requesting identity information (e.g., mDL or a predetermined element thereof). The first value may be a value indicating a first counter and a first identifier. For example, the first value may be 0x0000000000000000. The verification server 230 may perform operation 309 of encrypting the identity information request message (e.g., mDL session establishment data) using the first session key, and transmitting the encrypted identity information request message together with the public key of the verification server 230 to the authentication server 220. The authentication server 220 may perform operation 310 of transmitting the identity information request message (e.g., mDL device engagement data) to the authentication module 213 of the UE 210. The authentication module 213 may perform operation 311 of transmitting the identity information request message (e.g., mDL device engagement data) to the secure module 214. The verification server 230 may not encrypt the public key of the verification server 230 which is produced as a pair with the private key, and may transmit the public key as plain text to the UE 210 via the authentication server 220.

The secure module 214 may perform an operation of producing a first session key (identical to the first session key produced by the verification server 230) using a key derivation function that uses, as an input value, a first value, the public key of the verification server 230 obtained from the verification server 230 via the authentication module 213, and the private key of the UE 210 which is contained in the secure area, and an operation of identifying identity information requested by the verification server 230 by decoding, using the first session key, the encrypted identity information request message (e.g., mDL session establishment data) which is received from the verification server 230 via the authentication module 213. The first value may be a value indicating a first counter and a first identifier. For example, the first value may be 0x0000000000000000. The secure module 214 may perform an operation of producing a second session key using a key derivation function that uses, as an input value, a second value, the public key of the verification server 230 received from the verification server 230 via the authentication module 213, and the private key of the UE 210 which is contained in the secure area. The second value may be a value indicating a second counter and a second identifier. For example, the second value may be 0x0000000000000001. The secure module 214 may perform operation 312 of encrypting a verification request message (e.g., mDL session data) including identified identity information using the public key of the UE 210 and the second session key, and transmitting the encrypted verification request message to the authentication module 213. The authentication module 213 may perform operation 313 of transmitting the verification request message (e.g., mDL session data) to the authentication server 220. The authentication server 220 may perform operation 314 of transmitting the verification request message (e.g., mDL session data) to the verification server 230.

The verification server 230 may produce a second session key (identical to the second session key produced by the secure module 214) using a key derivation function that uses, as an input value, a second value, the public key of the UE 210 which is transmitted from the authentication module 213, and the private key of the verification server 230 which is produced by the verification server 230. The second value may be a value indicating a second counter and a second identifier. For example, the second value may be 0x0000000000000001. The verification server 230 may obtain identity information by decoding the verification request message (e.g., mDL session data) using the second session key. The verification server 230 may verify whether the obtained identity information is normally issued from an issuing authority. If it is identified that the identity information is normally issued, the verification server 230 may perform operation 315 of producing a one-time token and transmitting a URL including the token to the authentication server 220. The authentication server 220 may perform operation 316 of transmitting the token and the URL to the authentication module 213. The authentication module 213 may perform operation 317 of displaying, on the display 216, a code 399 (e.g., a QR code 450 of FIG. 4C or FIG. 4D or a barcode) including the token and URL (or the token if a domain name is fixed). The token may include information (e.g., a timestamp) indicating the expiration date of the corresponding token. Accordingly, the authentication module 213 may display time information related to the expiration data on the display 216. For example, the authentication module 213 may set a timer based on the expiration date, and may display the remaining time 460 of the timer on the display 216 in real time. Alternatively, the authentication module 213 may display a time bar corresponding to the designated time of the timer, and may display the time progress in the time bar on the display 216 in real time. In addition, together with the QR code 450 as illustrated in FIG. 4D, the authentication module 213 may provide an image 470 including brief identity information (e.g., a picture, a name, a birth date), and a 'view more' button 480 for calling detailed identity information (e.g., a picture, a name, a birth date, a license number, an issuing authority, and an expiration date) on the display 216.

The POS terminal 205 may perform operation 318 of reading the cord displayed on the display 216, and obtaining the token and the URL (or a token). The POS terminal 205 may perform operation 319 of transmitting the obtained token and URL (or the token) to the service server 240.

The service server 240 may perform operation 320 of accessing the verification server 230 using the token and the URL (or the token) so as to identify the identity verification result associated with the user. The service server 220 may perform operation 321 of transmitting the identified identity verification result to the POS terminal 205.

The secure module 214 may store the signature (e.g., a mobile security object (MSO)) of the issuing authority for a hash value which is obtained by applying identity information (e.g., mDL) to a hash function. The secure module 214 may further include MSO in the verification request message (e.g., mDL session data), in addition to the identity information, and may encrypt the verification request message (e.g., mDL session data) using the second session key and may transmit the encrypted verification request message to the authentication module 213. The authentication module 213 may transmit the encrypted message (e.g., the verification request message) including the identity information and the MSO to the verification server 230 via the authentication server 220. The verification server 230 may decode the received encrypted message using the second session key so as to obtain the identity information and the MSO. The verification server 230 may verify the identity of the user using the obtained identity information. In addition, the verification server 230 may verify whether the obtained MSO is signed with a signature key of a designated issuing authority (e.g., a government authority or a private agency) (e.g., whether the identity information is issued by a designated issuing authority). If the identity verification and the authentication of the issuing authority are complete, the verification server 230 may transmit the URL and the token to the authentication module 213 via the authentication server 220.

Figure 5:
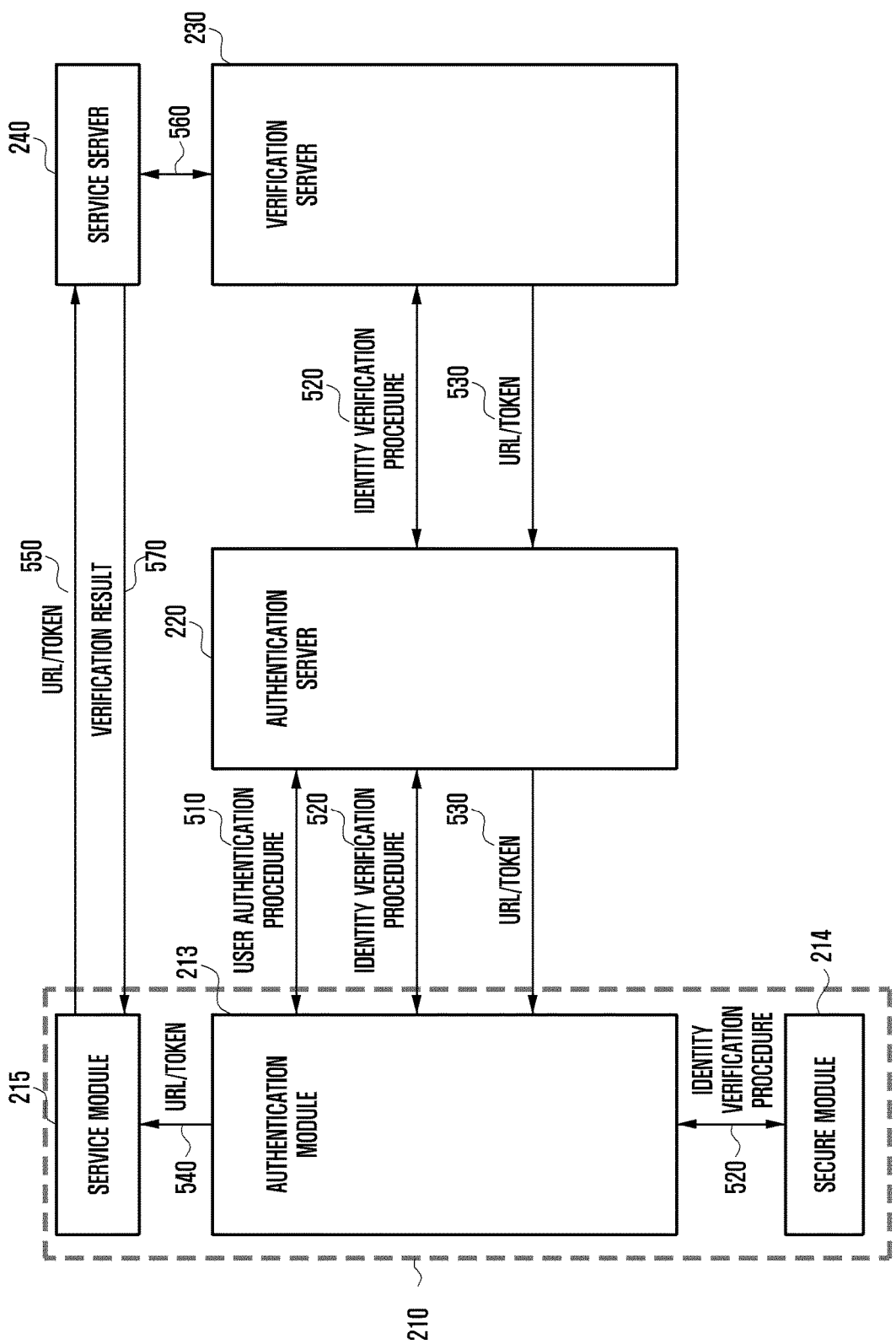
FIG. 5 is a signal flow diagram illustrating an example of verifying the identity of a user for a service server that provides an online service according to various embodiments.

FIG. 5 is a signal flow diagram illustrating an example of verifying the identity of a user for the service server 240 that provides an online service according to various embodiments. In the description of FIG. 5, a part that repeats the description of FIG. 3 may not be repeated, or may be briefly described.

According to an embodiment, FIG. 5 may correspond to an example in which the UE 210 operates in an online mode so as to verify the identity of a user. The online mode of the UE 210 may be an example in which the UE 210 provides a mobile identification service in the state of not receiving (or downloading) an issued mobile identification (or mobile identification data or identity information).

The service module 215 may display an execution screen for providing a service on the display 216. The service module 215 may request, from the authentication module 213, information (e.g., a token) used for verifying the identity of the user for the service server 240 in response to a service (e.g., digital car key) request received from the user via the execution screen. Accordingly, the authentication module 213 may display, on the display 216, a UI element (e.g., the second UI element 440 of FIG. 4B) for inducing the user to input biometric information. In response to the biometric information of the user received from the biometric sensor 212, the authentication module 213 may perform operation 510 (e.g., operations 301 to 304 of FIG. 3) for user authentication (e.g., FIDO authentication) via data communication with the authentication server 220.

If the user authentication is complete, the authentication module 213 may perform user identity verification operation 520 (e.g., operations 305 to 314 of FIG. 3) via data communication with the secure module 214 and data communication with the verification server 230 via the authentication server 220.

If the user identity is verified by the verification server 230, the authentication module 213 may perform operation 530 of receiving a URL and a token from the verification server 230 via the authentication server 220.

The authentication module 213 may perform operation 540 of transmitting the token and URL (or the token if a domain name is fixed) to the service module 215. The service module 215 may perform operation 550 of transmitting the received token and URL (or the token) to the service server 240.

The service server 240 may perform operation 560 of accessing the verification server 230 using the token and URL (or the token) so as to identify an identity verification result associated with the user. The service server 240 may perform operation 570 of transmitting the identified identity verification result to the service module 215.

Figure 6:
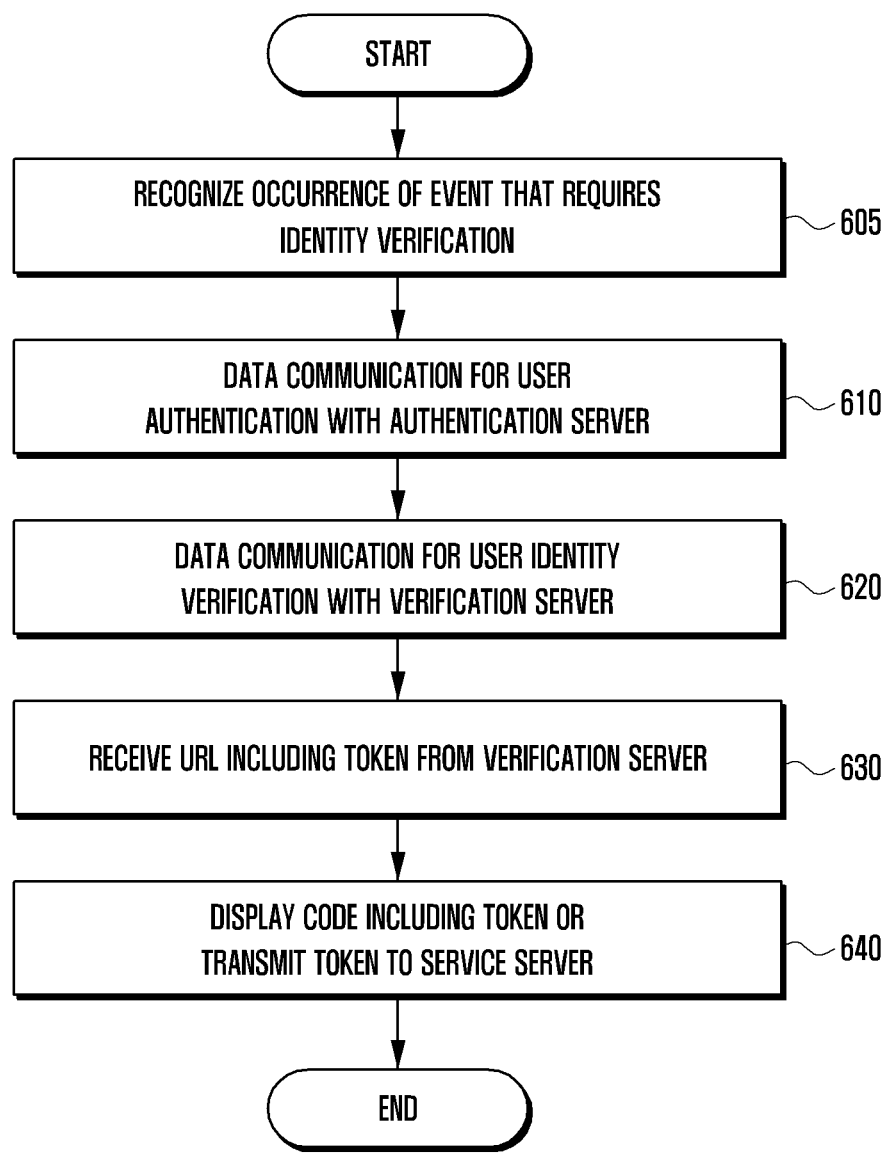
FIG. 6 is a flowchart illustrating example operations of a processor in a UE according to various embodiments.

FIG. 6 is a flowchart illustrating example operations of the processor 219 performed in the UE 210 according to various embodiments. The processor 219 of a UE (e.g., the electronic device 101 of FIG. 1 or the UE 210 of FIG. 2) may recognize the occurrence of an event that requires user identity verification in operation 605. For example, the event may be the case (hereinafter, a first event) in which user information (e.g., a password or biometric information) is received via the biometric sensor 212 or the display 216, while an execution screen of the authentication module 213 including an UI element that induces input of an identification image and biometric information (e.g., the execution screen 402 of FIG. 4B which supports purchasing of a product at an offline store) is displayed. The event may be the case (hereinafter, a second event) in which user information is received via the biometric sensor 212 or the display 216, while an execution screen of the service module 215 including a UI element that induces input of biometric information (e.g., a web browser or an application distributed by the service server 240) is displayed. Depending on the occurrence of the first event or the second event, the processor 219 may perform the following operations.

In operation 610, the processor 219 may perform data communication for user authentication with the authentication server 220 via the wireless communication module 211. For example, the processor 219 may perform primary authentication by comparing the received biometric information and stored biometric information. If the primary authentication is completed since the two pieces of biometric information are identical, the processor 219 may produce a primary authentication result value using a random number received from the authentication server 220 via the wireless communication module 211, and may request authentication server 220 to perform secondary authentication on the value. The processor 219 may complete user authentication by receiving a secondary authentication result value from the authentication server 220 via the wireless communication module 211 in response to the request.

If the user authentication is completed in operation 610, the processor 219 may perform data communication for user identity verification with the verification server 230 via the wireless communication module 211 in operation 620. The processor 219 may perform data communication with the verification server 230 via the authentication server 220. The processor 219 may perform end-to-end encryption communication with the verification server 230 in order to protect identity information. For example, the processor 219 may produce a pair of a private key and a public key, may contain the private key in a secure area (e.g., eSE), and may transmit a message (e.g., mDL device engagement data) for requesting engagement in identity verification and the public key to the verification server 230 via the wireless communication module 211. In response to the engagement request message, the processor 219 may receive an encrypted identity information request message (e.g., mDL session establishment data) and the public key from the verification server 230 via the wireless communication module 211. The processor 219 may produce a first session key using the private key contained in the secure area and the public key received from the verification server 230, may decode the identity information request message using the first session key, and may identify identity information requested by the verification server 230. The processor 219 may obtain, from the secure area (e.g., eSE), the identity information (e.g., mDL or a part of them) requested by the verification server 230. The processor 219 may produce a second session key using the private key contained in the secure area and the public key received from the verification server 230, may encrypt, using the second session key, the identity information requested by the verification server 230, and may transmit the encrypted identity information to the verification server 230 via the wireless communication module 211. In addition, the processor 219 may encrypt the signature (e.g., MSO) of an issuing authority together with the identity information and may transmit the same to the verification server 230.

Since the identity information (or identity information and the signature of the issuing authority) transmitted to the verification server 230 is verified, the processor 219 may receive a URL including a token from the verification server 230 via the wireless communication module 211 in operation 630.

In operation 640, the processor 219 may display a code (a barcode or a QR code) including at least the token on the display 216 in response to the occurrence of the first event, or may transmit at least the token to the service server 240 via the wireless communication module 211 in response to the occurrence of the second event.

Figure 7:
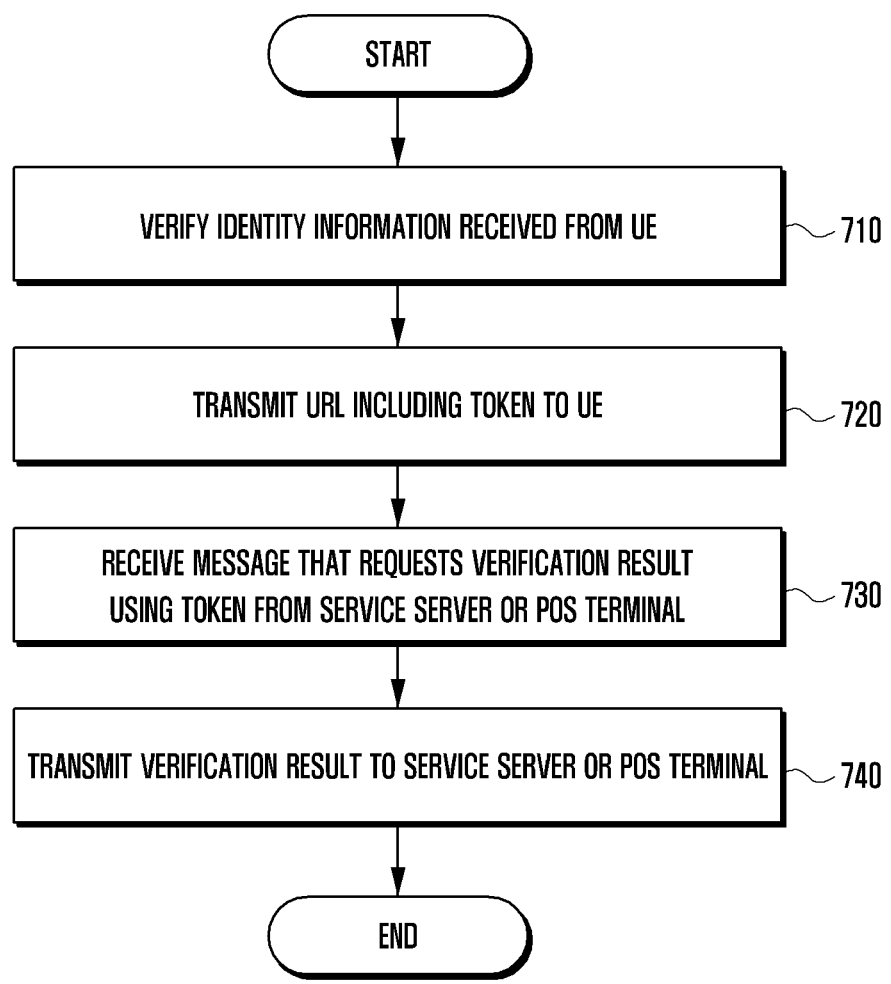
FIG. 7 is a flowchart illustrating example operations of a processor in a verification server according to various embodiments.

FIG. 7 is a flowchart illustrating example operations of the processor 233 in the verification server 230 according to various embodiments.

In operation 710, the processor 233 may verify identity information received from the UE 210 via the communication module 231. For example, the processor 233 may receive a message for requesting engagement in verification (e.g., mDL device engagement data) and a public key from the UE 210 via the communication module 231. The processor 233 may produce a private key and a public key, may produce a first session key using the produced private key and the public key received from the UE 210, may encrypt, using a first session key, a message for requesting identity information, and may transmit the encrypted identity information request message (e.g., mDL session establishment data) and the public key produced by the processor 233 to the UE 210 via the communication module 231. The processor 233 may receive encrypted identity information from the UE 210 via the communication module 231, in response to the identity information request. The processor 233 may produce a second session key using the produced private key and the public key received from the UE 210, and may decode the encrypted identity information using the second session key, so as to perform verification. In addition, the processor 233 may receive the signature (e.g., MSO) of an issuing authority, may decode the encrypted signature using the second session key, and may perform verification.

If it is identified that the identity information received from the UE 210 is normally issued (in addition, if the received signature is identified as being signed by the issuing authority), the processor 233 may transmit a URL including a token for accessing an identity information verification result to the UE 210 via the communication module 231 in operation 720. The processor 233 may include information (e.g., a timestamp) indicating an expiration data in the token.

In operation 730, the processor 233 may receive a message for requesting a verification result using a token from the service server 240 or from the POS terminal 205 via the service server 240. If the token received from the service server 240 expires, the processor 233 may transmit a message that rejects the request or a message indicating that the token expires to the service server 240.

In operation 740, the processor 233 may transmit the verification result to the service server 240 via the communication module 231, in response to the verification result request using the token.

According to various example embodiments, a portable electronic device (e.g., the UE 210 of FIG. 2) may include: a biometric sensor; a touch sensing display; a wireless communication module including wireless communication circuitry; a processor operatively connected to the biometric sensor, the display, and the wireless communication module; and a memory operatively connected to the processor, wherein the memory stores instructions which, when executed, cause the processor to: control the wireless communication module to: perform data communication for user authentication with an authentication server based on receiving biometric information of a user from the biometric sensor, perform data communication for identity verification of the user with a verification server via the wireless communication module based on verifying that the user is qualified to use the portable electronic device via the data communication with the authentication server, receive, from the verification server via the wireless communication module, a uniform resource locator (URL) including a one-time token for accessing a verification result provided by the verification server, transmit the one-time token to a service server that provides an on-line service via the wireless communication module, and control the display to display a code including the one-time token on the display.

The one-time token may be transmitted to the service server after an execution screen of an application for supporting the online-service is displayed, and the code may be displayed after an execution screen of an application for supporting purchasing of a product in an offline store is displayed.

As at least a part of the data communication for identity verification, the instructions, when executed, cause the processor to control the wireless communication module to transmit a first public key and a message that requests engagement in the identity verification to the verification server, to receive a second public key and an encrypted identify information request message from the verification server via the wireless communication module in response to the engagement request message, to produce a first session key using a private key produced as a pair with the first public key and the second public key, to decode the identity information request message using the first session key to identify identity information that the verification server requests, and obtain the identified identity information from the memory to produce a second session key using the private key and the second public key, and to encrypt the obtained identity information using the second session key, and transmit the encrypted identity information to the verification server via the wireless communication module.

The instructions, when executed, cause the processor to obtain a mobile driving license (mDL) or a predetermined element of the mDL from the memory, as the identity information that the verification server requests.

The instructions, when executed, cause the processor to encrypt a signature of an issuing authority that issues the obtained identity information, together with the obtained identity information, and to transmit the encrypted information to the verification server via the wireless communication module.

The instructions, when executed, cause the processor to obtain the identified identity information from a secure area of the memory.

The instructions, when executed, cause the processor to store the private key in the secure area.

The instructions, when executed, cause the processor to control the wireless communication module to perform the data communication for identity verification with the verification server, via the authentication server.

As at least a part of the data communication for user authentication, the instructions, when executed, cause the processor to perform a primary authentication by comparing the received biometric information and biometric information stored in the memory, to produce a primary authentication result value using a random number received from the authentication server via the wireless communication module based on the primary authentication being complete, to transmit a message that requests secondary authentication associated with the primary authentication result value to the authentication server via the wireless communication module, and to receive a secondary authentication result value from the authentication server via the wireless communication module in response to the secondary authentication request message.

As at least a part of the primary authentication, the instructions, when executed, cause the processor to compare fingerprint information received from the biometric sensor and fingerprint information stored in the memory.

The instructions, when executed, cause the processor to control the display to display a barcode or a QR code as the code.

The instructions, when executed, cause the processor to receive information indicating an expiration date of the token from the verification server via the wireless communication module, and to control the display to display time information related to the expiration date on the display.

According to various example embodiments, an electronic device (e.g., the verification server 230 of FIG. 2) may include: a communication module including communication circuitry; a processor operatively connected to the communication module; and a memory operatively connected to the processor, wherein the memory stores instructions which, when executed, cause the processor to: control the communication module to perform data communication for identity verification of a user with a user equipment (UE), transmit a uniform resource locator (URL) including a one-time token for accessing an identity verification result to the UE via the communication module, and transmit the identity verification result to the external electronic device via the communication module in response to receiving a token from an external electronic device via the communication module.

As at least a part of the data communication for identity verification, the instructions, when executed, cause the processor to receive a first public key and a message that requests engagement in the identity verification from the UE via the communication module, to produce a first session key using a private key and the first public key, to encrypt a message that requests identity information using the first session key, and to transmit a second public key produced as a pair when the private key is produced, and the encrypted identity information request message to the UE via the communication module, in response to the engagement request message, to receive an encrypted verification request message from the UE via the communication module, to produce a second session key using the private key and the first public key, to obtain identity information by decoding the verification request message using the second session key, and to verify identity of the user using the obtained identity information.

The instructions, when executed, cause the processor to control the communication module to transmit a message that requests a mobile driving license (mDL) or a predetermined element of the mDL to the UE as the identity information.

The instructions, when executed, cause the processor to obtain a signature of an authority that issues the obtained identity information from the decoded verification request message, to authenticate the issuing authority using the obtained signature, and to control the communication module to transmit the URL to the UE based on the verification of the identity of the user and the authentication of the issuing authority.

The instructions, when executed, cause the processor to perform the data communication for identity verification with the UE via an authentication server, and authentication server is configured to perform data communication for user authentication with the UE.

The external electronic device is a service server or a point of sale (POS) terminal, and the service server is configured to provide an online service to the UE via a network, and the POS terminal is configured to read a barcode or a QR code, and the instructions enable the processor to receive the token from the service server or the POS terminal.

If a designated expiration data of the token received from the external electronic device elapses, the instructions, when executed, cause the processor to control the communication module to transmit, to the external electronic device, a message that rejects a request from the external electronic device in association with the identity verification result or a message indicating that the token expires.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A portable electronic device comprising:
   a biometric sensor;
   a touch sensing display;
   a wireless communication module comprising wireless communication circuitry;
   at least one processor, comprising processing circuitry, operatively connected to the biometric sensor, the display, and the wireless communication module; and
   memory operatively connected to the at least one processor,
   wherein the memory stores instructions which, when executed, configure the at least one processor to individually or collectively control the portable electronic device to at least:
      based on receiving biometric information of a user from the biometric sensor, perform data communication for user authentication with an authentication server via the wireless communication module;
      based on verifying that the user is qualified to use the portable electronic device via the data communication with the authentication server, perform data communication for identity verification of the user with a verification server via the wireless communication module;
      receive, from the verification server via the wireless communication module, a uniform resource locator (URL) including a one-time token for accessing a verification result provided by the verification server;
      in response to an execution screen of an application for supporting an online purchasing service being displayed, transmit the one-time token to a service server configured to provide the online purchasing service via the wireless communication module; and
      in response to an execution screen of an application for supporting purchasing of a product in an offline store being displayed, control the display to display a code including the one-time token.

2. The portable electronic device of claim 1, wherein, as at least a part of the data communication for identity verification, the instructions, when executed, configure the at least one processor to individually or collectively control the portable electronic device to:
   transmit a first public key and an engagement request message requesting engagement in identity verification to the verification server via the wireless communication module;
   receive a second public key and an encrypted identify information request message from the verification server via the wireless communication module, in response to the engagement request message;
   produce a first session key using a private key produced as a pair with the first public key, and the second public key;
   decode the identity information request message using the first session key to identify identity information requested by the verification server, and obtain the identified identity information from the memory;
   produce a second session key using the private key and the second public key; and
   encrypt the obtained identity information using the second session key, and transmit the encrypted identity information to the verification server via the wireless communication module.

3. The portable electronic device of claim 2, wherein the instructions, when executed, configure the at least one processor to individually or collectively control the portable electronic device to obtain a mobile driving license (mDL) or a predetermined element of the mDL from the memory as the identity information requested by the verification server.

4. The portable electronic device of claim 2, wherein the instructions, when executed, configure the at least one processor to individually or collectively control the portable electronic device to encrypt a signature of an issuing authority that issues the obtained identity information together with the obtained identity information, and transmit the encrypted information to the verification server via the wireless communication module.

5. The portable electronic device of claim 2, wherein the instructions, when executed, configure the at least one processor to individually or collectively control the portable electronic device to obtain the identified identity information from a secure area of the memory.

6. The portable electronic device of claim 5, wherein the instructions, when executed, configure the at least one processor to individually or collectively control the portable electronic device to store the private key in the secure area.

7. The portable electronic device of claim 1, wherein the instructions, when executed, configure the at least one processor to individually or collectively control the portable electronic device to perform the data communication for identity verification with the verification server via the authentication server.

8. The portable electronic device of claim 1, wherein, as at least a part of the data communication for user authentication, the instructions, when executed, configure the at least one processor to individually or collectively control the portable electronic device to:
perform a primary authentication by comparing the received biometric information and biometric information stored in the memory;
based on the primary authentication being completed, produce a primary authentication result value using a random number received from the authentication server via the wireless communication module;
transmit a message requesting secondary authentication associated with the primary authentication result value to the authentication server via the wireless communication module; and
receive a secondary authentication result value from the authentication server via the wireless communication module in response to the secondary authentication request message.

9. The portable electronic device of claim 8, wherein, as at least a part of the primary authentication, the instructions, when executed, configure the at least one processor to individually or collectively control the portable electronic device to compare fingerprint information received from the biometric sensor and fingerprint information stored in the memory.

10. The portable electronic device of claim 1, wherein the instructions, when executed, configure the at least one processor to individually or collectively control the portable electronic device to display a barcode or a QR code as the code.

11. The portable electronic device of claim 1, wherein the instructions, when executed, configure the at least one processor to individually or collectively control the portable electronic device to:
receive information indicating an expiration date of the token from the verification server via the wireless communication module; and
display time information related to the expiration date on the display.

12. An electronic device comprising:
a communication module comprising communication circuitry;
at least one processor, comprising processing circuitry, operatively connected to the communication module; and
memory operatively connected to the at least one processor,
wherein the memory stores instructions which, when executed, configure the at least one processor to individually or collectively control the electronic device to at least:
control the communication module to perform data communication for identity verification of a user with a user equipment (UE);
transmit a uniform resource locator (URL) including a one-time token for accessing an identity verification result to the UE via the communication module;
receiving, via the communication module, the token from an external electronic device configured to acquire the token which is transmitted to the UE by the electronic device; and
in response to receiving the token from the external electronic device, transmit, via the communication module, the identity verification result to the external electronic device for authenticating the user of the UE to the external electronic device.

13. The electronic device of claim 12, wherein, as at least a part of the data communication for identity verification, the instructions, when executed, configure the at least one processor to individually or collectively control the electronic device to:
receive from the UE, via the communication module, a first public key and a message requesting engagement in the identity verification;
in response to receiving the engagement request message, produce a first session key using a private key and the first public key, encrypt, using the first session key, a message requesting identity information, and transmit to the UE, via the communication module, a second public key produced as a pair when the private key is produced, and the encrypted identity information request message;
receive from the UE, via the communication module, an encrypted verification request message;
produce a second session key using the private key and the first public key;
obtain identity information by decoding the verification request message using the second session key; and
verify identity of the user using the obtained identity information.

14. The electronic device of claim 13, wherein the instructions, when executed, configure the at least one processor to individually or collectively control the electronic device to transmit to the UE a message requesting a mobile driving license (mDL) or a predetermined element of the mDL as the identity information.

15. The electronic device of claim 13, wherein the instructions, when executed, configure the at least one processor to individually or collectively control the electronic device to:
obtain a signature of an issuing authority that issues the obtained identity information from the decoded verification request message;
authenticate the issuing authority using the obtained signature; and
transmit the URL to the UE based on the verification of the identity of the user and the authentication of the issuing authority.

16. The electronic device of claim 12, wherein the instructions, when executed, configure the at least one processor to individually or collectively control the electronic device to:
    perform the data communication for identity verification with the UE via an authentication server, and
    wherein the authentication server is configured to perform data communication for user authentication with the UE.

17. The electronic device of claim 12, wherein the external electronic device is a service server or a point of sale (POS) terminal, and the service server is configured to provide an online service to the UE via a network, and the POS terminal is configured to read a barcode or a QR code, and
    wherein the instructions, when executed, configure the at least one processor to individually or collectively control the electronic device to receive the token from the service server or the POS terminal.

18. The electronic device of claim 12, wherein the instructions, when executed, configure the at least one processor to individually or collectively control the electronic device to:
    based on a designated expiration data of the token received from the external electronic device elapsing, transmit, to the external electronic device, a message that rejects a request from the external electronic device in association with the identity verification result or a message indicating that the token expires.

\* \* \* \* \*